US007453664B2

(12) United States Patent
Kawabe

(10) Patent No.: US 7,453,664 B2
(45) Date of Patent: Nov. 18, 2008

(54) POSITIONING CONTROL CIRCUIT, MEASUREMENT APPARATUS FOR TRACE INFORMATION AND RELATED METHOD

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 11/509,124

(22) Filed: Aug. 24, 2006

(65) Prior Publication Data

US 2007/0242387 A1   Oct. 18, 2007

(30) Foreign Application Priority Data

Apr. 14, 2006   (JP) ............................. 2006-112337

(51) Int. Cl.
*G11B 5/596* (2006.01)
(52) U.S. Cl. .................................................. 360/77.08
(58) Field of Classification Search ............... 360/77.08, 360/77.04, 75, 77.02, 78.04, 48
See application file for complete search history.

(56) References Cited

U.S. PATENT DOCUMENTS

| 4,136,365 | A | * | 1/1979 | Chick et al. ............... 360/78.05 |
| 4,149,199 | A | * | 4/1979 | Chick et al. ............... 360/77.04 |
| 5,170,299 | A | * | 12/1992 | Moon ....................... 360/77.08 |
| 6,469,853 | B1 | * | 10/2002 | Satoh .......................... 360/48 |
| 6,519,107 | B1 | * | 2/2003 | Ehrlich et al. ................. 360/75 |
| 6,556,365 | B2 | * | 4/2003 | Satoh .......................... 360/48 |

FOREIGN PATENT DOCUMENTS

JP   09-091903   4/1997

* cited by examiner

*Primary Examiner*—Fred Tzeng
(74) *Attorney, Agent, or Firm*—Greer, Burns & Crain, Ltd

(57) ABSTRACT

A magnetic disk apparatus is configured so as to read trace information from a discrete track recording medium recording the trace information for making a servo locus of a magnetic head trace the center line of physical tracks and control the servo locus of the magnetic head onto the center line of the physical tracks.

13 Claims, 15 Drawing Sheets

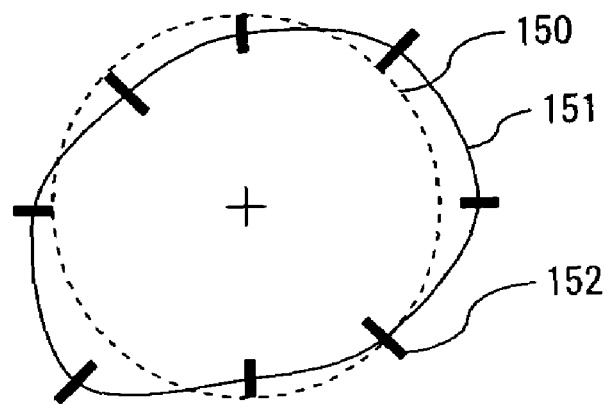
F I G. 1 A
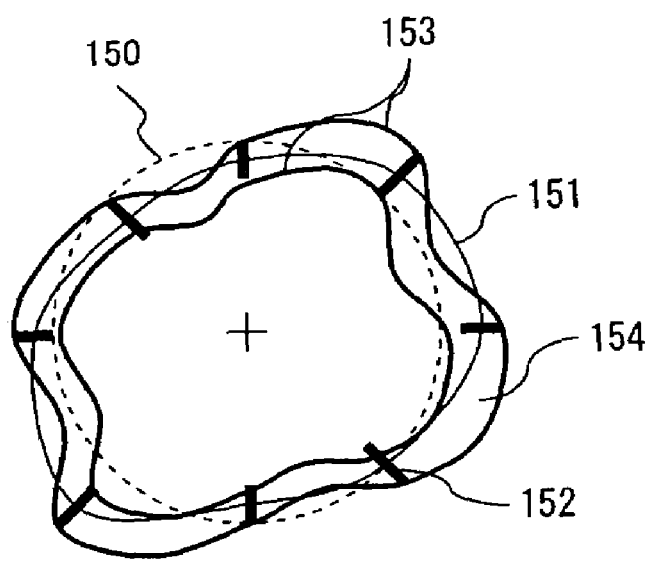
F I G. 1 B

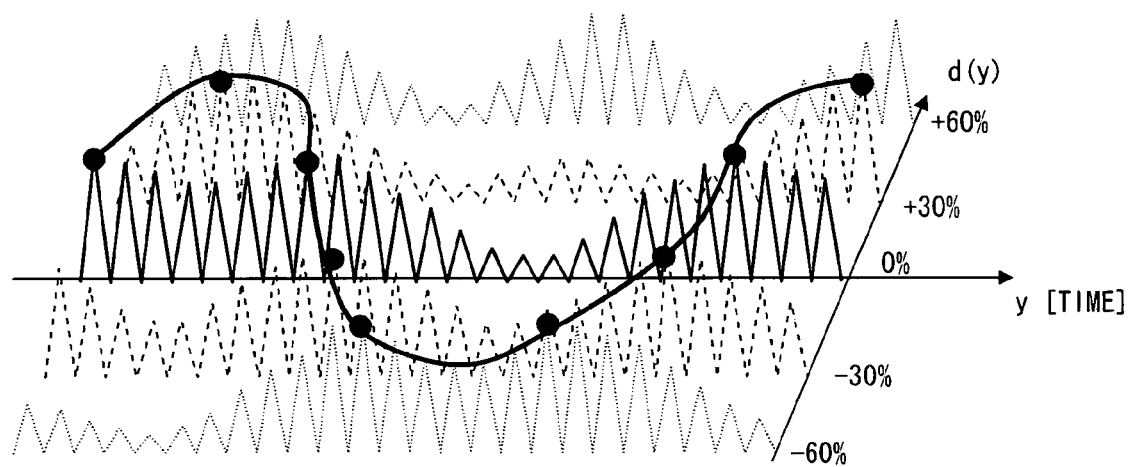
F I G. 3

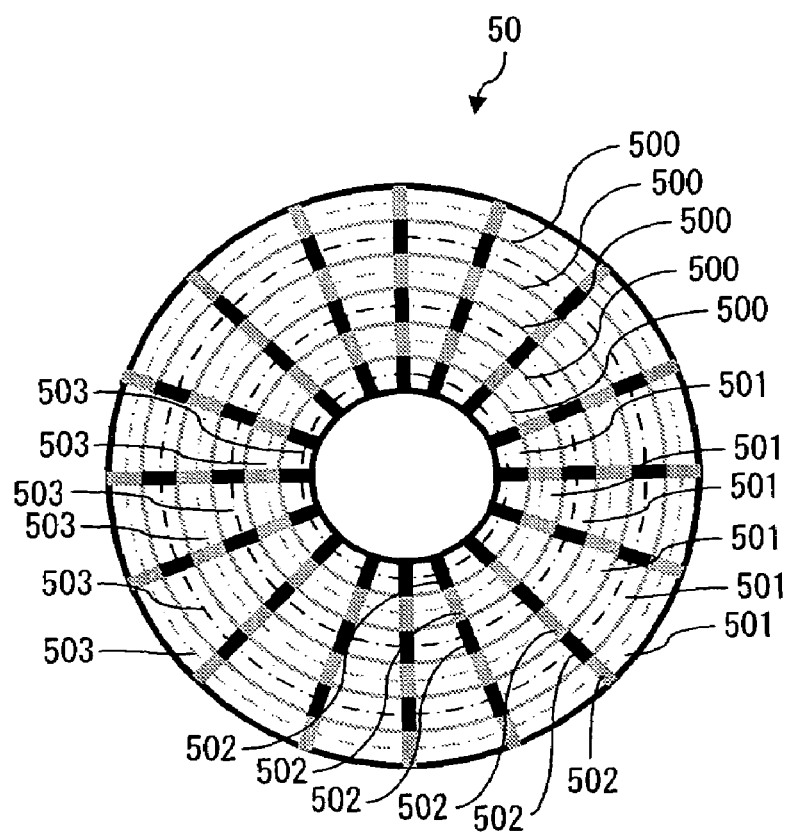
F I G. 7

POSITIONING CONTROL CIRCUIT, MEASUREMENT APPARATUS FOR TRACE INFORMATION AND RELATED METHOD

BACKGROUND OF THE INVENTION

1. Field of the Invention

The present invention relates to a technique for making a servo locus of a magnetic head, which is controlled for positioning thereof according to servo information recorded on a magnetic disk medium of a discrete track recording (DTR) system, trace on a track which is formed between two guard bands on the magnetic disk medium.

2. Description of the Related Art

Currently, many a magnetic disk apparatus adopts a servo sector system.

The surface of a magnetic disk medium equipped on a magnetic disk apparatus is written by position information (which is called servo information, and a zone including the information is called a servo sector) indicating positions on the medium at a constant interval on a circle, and from one servo sector to the next servo sector is allocated as a zone for a data writing (which is called a data sector). And a plurality of concentric circle tracks (of the track numbers 1 through Tn, where Tn is an integer) constituted by the aforementioned circle as one track are formed on the surface. In this configuration, a pair of one servo sector and one data sector constitutes a smallest unit (i.e., a sector), with the sector being continuously formed in each track on the surface of the magnetic disk medium. Note that the above noted servo track is fixed for position as a result of servo information being written by a dedicated servo track writer and that a writing of information to a data sector between the servo sectors can be carried out under a later described control of the relevant magnetic disk apparatus.

The magnetic disk apparatus reads position information recorded in a servo sector on the above noted magnetic disk medium from a magnetic head, controls a rotation of a drive motor (i.e., a servo motor), which positions the magnetic head in the radial direction of the magnetic disk medium, so as to reduce to zero ("0"), the difference between the position information of the readout position and that of a target position, and makes the magnetic head reach a target position. A magnetic disk medium commonly use a continuous thin film medium, and therefore a data writing to the aforementioned continuous thin film medium, which is recorded by the above noted servo information, is carried out by moving the magnetic head to a servo sector belonging to a track number designated for the data writing, scanning from the servo sector to a designated servo sector (which is a servo sector belonging to a sector number designated for a data writing) on the track by rotating the magnetic disk medium, and generating a magnetic field for a writing by the magnetic head from the rear stage of the designated servo sector to the next servo sector. Note that the servo information of each servo sector includes burst information which is correction information of each servo sector for the magnetic head to reach at the center of the next servo sector. The magnetic head reads the correction information from each servo sector and minutely adjusts an arrival position of the next servo sector, thereby suppressing a positional displacement thereat. For a data reading, meanwhile, the magnetic head reads data by scanning on the data sector along the same locus as described above and converting the magnetically written data into an electrical signal by the magnetic head itself.

On a continuous thin film medium, servo sectors are formed by the servo track writer, while data sectors are formed between adjacent servo sectors within a servo sector, which is formed by the servo track writer, along a movement locus of the magnetic head passing under the above described positioning control. And the locus becomes a track of the magnetic disk medium (which is called a servo locus, while a servo sector part within the track is called a servo track and a data sector part is called a data track in the following description).

As described above, the information of the above described servo sector is recorded on a magnetic disk medium by the servo track writer. This is a process carried out prior to the shipment of a product, thus making it different from an actually shipped apparatus, and therefore a slight variance occurs in a positioning accuracy of the magnetic head against a servo sector in the case of equipping the magnetic disk medium on the actually shipping apparatus due to an error among the apparatuses of the shipping apparatuses. Therefore, a user writes positional correction information to a user writable zone (which is called a repeatable run out (RRO) zone) furnished for a servo sector in order to absorb a variance of each apparatus, thereby making it possible to suppress an occurrence of a positional displacement at a servo sector position of the magnetic head. An example of this technique is disclosed in a Laid-Open Japanese Patent Application Publication No. 09-91903. This publication has disclosed an example which calculates a positional error average value at the time of controlling a positioning at each servo sector, writes the information to the user writable zone and corrects a displacement of the servo sector based on the written information. This method allows a correction of a displacement of a servo sector, thus enabling the magnetic head to always reach at the center position when passing the servo sector position.

SUMMARY OF THE INVENTION

The present invention accordingly aims at providing a method for measuring trace information in order to make a physical track tracing a servo locus and the related measurement record apparatus, a discrete track recording (DTR) medium recording the trace information, a positioning control circuit for controlling a magnetic head by using the trace information and a magnetic disk apparatus comprising the positioning control circuit.

A purpose of the present invention is to provide a measurement method of trace information for making a physical track tracing a servo locus. A measurement of a displacement amount between the center line of a physical track formed in between two guard bands on a DTR medium and a servo reference locus of a magnetic head scanning on the DTR medium is carried out by recording a repeat pattern in between the two guard band; scanning repeatedly on the repeat pattern by the magnetic head while shifting a servo locus of the magnetic head in the radial direction of the discrete track recording (DTR) medium in steps from the servo reference locus; recording an amplitude variation of a signal reproduced by, and transmitted from, the magnetic head based on the repeat pattern during the scanning; and determining a displacement amount of the magnetic head from the servo reference locus in terms of an amplitude value which indicates the center of the physical track within the amplitude variation as the displacement amount of the physical track relative to the servo reference locus.

Another purpose of the present invention is to provide a measurement apparatus of trace information for making a physical track tracing a servo locus. Premising a measurement record apparatus scanning a servo sector and a repeat pattern forming zone between the servo sector and next servo sector on a physical track of a discrete track recording (DTR) medium by a magnetic head based on a servo reference locus, the apparatus comprises: a unit for making the magnetic head scan repeatedly on the repeat pattern between the servo sectors while shifting a servo locus of the magnetic head in the radial direction of the discrete track recording (DTR) medium by an increment of a predetermined offset amount from the servo reference locus; a unit for recording an amplitude variation of a signal reproduced by, and transmitted from, the magnetic head based on the repeat pattern during the scanning; a unit for extracting a displacement amount of the magnetic head from the servo reference locus in terms of an amplitude value which indicates the center of the physical track within the amplitude variation; and a recording unit for recording the extracted displacement amount in the discrete track recording (DTR) medium.

Yet another purpose of the present invention is to provide a positioning control circuit which control magnetic head with trace information above described and which comprises a demodulation unit for demodulating trace information from a discrete track recording (DTR) medium; and a control unit for controlling a servo locus of a magnetic head according to the trace information.

BRIEF DESCRIPTION OF THE DRAWINGS

FIG. 1A and FIG. 1B is a diagram showing a relationship between a servo locus and a physical track of a conventional magnetic head;

FIG. 3 shows an amplitude variation profile of a repeat pattern reproduction signal obtained from a magnetic head;

FIG. 7 is a sector placement diagram of a DTR medium 50;

DESCRIPTION OF THE PREFERRED EMBODIMENTS

Figure 2:
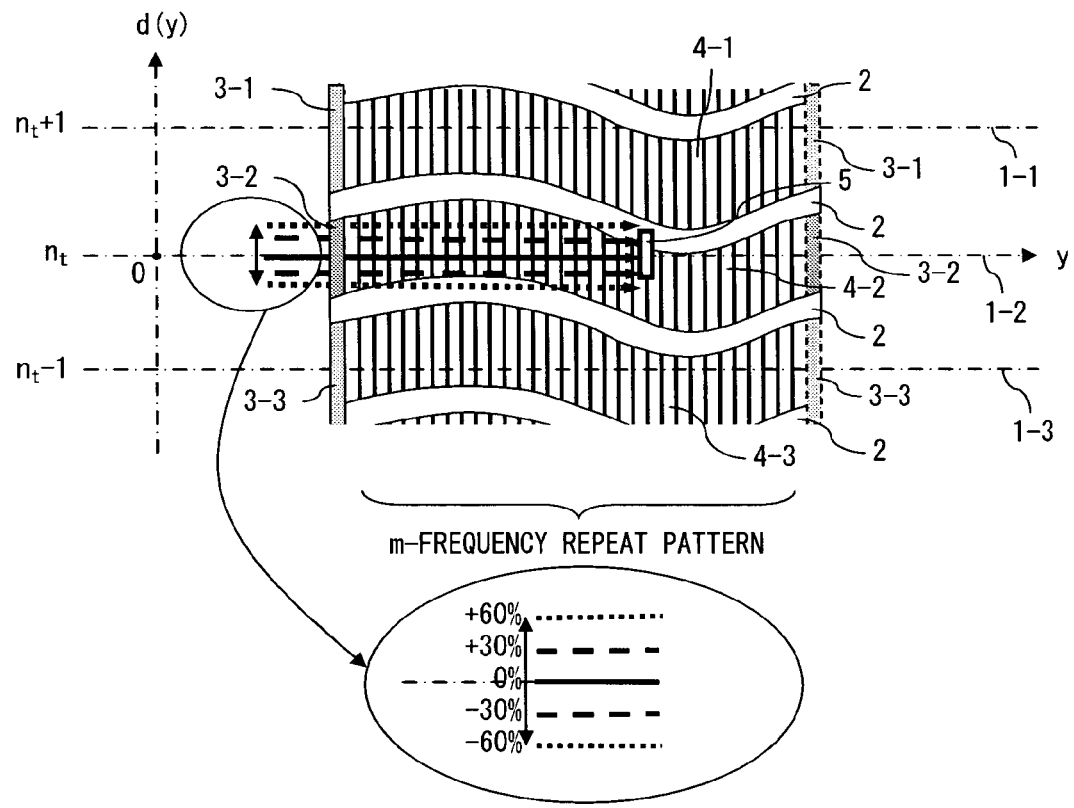
FIG. 2 shows a servo sector and a data sector which are included in one sector length of a physical track.

Recent years have witnessed developments of techniques for improving recording densities of magnetic disk media for use in magnetic disk apparatuses. As a result, no longer ignorable is an influence of an adjacent magnetization due to a closing of a distance with adjacent data.

Accordingly advocated is a system for physically ramifying the surface of a magnetic disk medium and shutting off an influence of an adjacent magnetization (among which the one aiming at shutting off an influence of an adjacent magnetization for the cross-track direction is called a discrete track recording (DTR) system). A magnetic disk medium of this system adopts a structure for cutting off the adjacent tracks physically by a groove called a guard band, with a further structure for cutting off the adjacent sectors on each track. Note that the guard band is simultaneously formed at the time of a servo sector being formed.

FIG. 1A shows a servo locus of a magnetic head scanning one track on a magnetic disk medium.

In the case of forming a servo sector by a servo track writer, the servo sector cannot actually be placed on an ideal true circle. Consequently, a servo locus of a magnetic head scanning on a track by extracting information from the servo sector is also displaced from such a true circle. FIG. 1A relationally shows these tracks displaced from a true circle.

The dotted line 150 of FIG. 1A is an ideal true circle, while the solid line 151 is a servo locus. The drawing makes it apparent that the current servo locus 151 passes each servo sector 152 placed by being displaced a little by little from the true circle 150 and also traces loci respectively displaced from a true circle in between individual servo sectors 152.

At this point in time, let it be considered a DTR medium on which a track is physically formed (called "physical track" hereinafter) by a guard band. Note that only a guard band cutting off the adjacent tracks is shown herein for simplifying a description.

FIG. 1B is a diagram further overlapping the guard band 153 with the servo locus 151 which is shown in FIG. 1A.

As described above, the guard band 153 is formed along with a servo sector and therefore it cannot be formed as a true circle and instead formed along with the servo sector 152 by being displaced from the true circle 150.

Contrary to a displacement of the guard band 153 from the true circle 150, which is generated as a result of a physical displacement at the time of forming the guard band reflecting to the entirety thereof, the displacement of the servo locus 151 is generated as a result of displacement due to a control of the magnetic head caused by noises at the time of modulating and demodulating servo information at the servo sector position 152 and a mechanical displacement.

Consequently, although the physical track 154 formed by the guard band 153 and the track 151 on the servo locus are approximately identical at servo sector positions which are actually formed on the magnetic disk medium, they are displaced from each other in between individual servo sectors because each of them is displaced by a difference cause (that is, when considering the guard band 153 as reference, the servo locus 151 tracks a locus which is displaced from that of the guard band 153). In the case of utilizing a DTR medium, the magnetic head reading and writing data does not scan along the track 154 formed by the guard band 153, since the magnetic head writing and reading data operates according to the servo locus 151.

One of aspects of a positioning control circuit according to the present invention is configured to read trace information from a DTR medium recording the trace information for making a servo locus of a magnetic head tracing the center line of a physical track and controls the servo locus of the magnetic head to the center line of the physical track.

Another of aspects of a positioning control circuit according to the present invention is configured to include a demodulation unit for demodulating trace information from a DTR medium; and a control unit for controlling a servo locus of a magnetic head according to the trace information.

This embodiment is preferably configured so that the demodulation unit demodulates a plural pieces of trace information, which are recorded in a predetermined sequence for each servo sector of a discrete track recording (DTR) medium, in the sequence, and the control unit reflects, in the aforementioned sequence, the demodulated trace information for each servo sector to a servo locus of a magnetic head which scans in one data sector range.

One of aspects of a magnetic disk apparatus according to the present invention is configured to comprise either one of the above noted positioning control circuits.

One of aspects of a measurement method according to the present invention, premising a measurement of a displacement amount between the center line of a physical track formed in between two guard bands on a DTR medium and a servo reference locus of a magnetic head scanning on the DTR medium comprises the steps of recording a repeat pattern in between the two guard bands; scanning repeatedly on the repeat pattern by the magnetic head while shifting a servo locus of the magnetic head in the radial direction of the discrete track recording (DTR) medium in steps from the servo reference locus; recording an amplitude variation of a signal reproduced by, and transmitted from, the magnetic head based on the repeat pattern during the scanning;

and determining a displacement amount of the magnetic head from the servo reference locus in terms of an amplitude value which indicates the center of the physical track within the amplitude variation as the displacement amount of the physical track relative to the servo reference locus.

In this case a preferred configuration comprises the steps of recording a repeat pattern across the entirety of a data sector zone between the two guard bands; scanning repeatedly across the entirety of the data sector by the magnetic head while shifting a servo locus of the magnetic head in the radial direction of the discrete track recording (DTR) medium in steps from the servo reference locus; recording an amplitude variation of a signal reproduced by, and transmitted from, the magnetic head based on the repeat pattern during the scanning together with a position of the magnetic head on the servo reference locus and a variation thereof from the servo reference locus which indicate a position thereof on the servo locus; and determining the variation, which gains the maximum amplitude value within the amplitude variation in each position on the servo reference locus, as the displacement amount of the physical track at each position on the servo reference locus.

One of aspects of a DTR medium according to the present invention is configured to be equipped on a magnetic disk apparatus making a servo locus of a magnetic head tracing the center line of a physical track by using trace information and record the trace information enabling the magnetic disk apparatus to read.

One of aspects of a measurement record apparatus according to the present invention, premising scanning a servo sector and a repeat pattern forming zone between the servo sector and next servo sector on a physical track of a discrete track recording (DTR) medium by a magnetic head based on a servo reference locus, comprises: a unit for making the magnetic head scan repeatedly on the repeat pattern between the servo sectors while shifting a servo locus of the magnetic head in the radial direction of the discrete track recording (DTR) medium by an increment of a predetermined offset amount from the servo reference locus; a unit for recording an amplitude variation of a signal reproduced by, and transmitted from, the magnetic head based on the repeat pattern during the scanning; a unit for extracting a displacement amount of the magnetic head from the servo reference locus in terms of an amplitude value which indicates the center of the physical track within the amplitude variation; and a recording unit for recording the extracted displacement amount in the discrete track recording (DTR) medium.

As such, the present invention is contrived to measure a displacement of a servo locus within a data sector of a physical track and record the measurement result as trace information in a DTR medium; and use the trace information when positioning a magnetic head between data sectors.

This configuration makes a servo locus tracing the center line of a track formed by guard bands, actually making a magnetic head scan the approximate center line of a track within the guard band on a magnetic disk medium. Because of this, even if a DTR medium is used in a servo sector type magnetic disk apparatus, a data writing to a data sector within the guard band and a data reading from the data sector can be carried out in high accuracy by the magnetic head.

The following is a detailed description of the preferred embodiment of the present invention by referring to the accompanying drawings.

The present embodiment exemplifies a configuration having a structure in which only a track is cut off by a guard band, as a magnetic disk medium of a discrete track recording system ("DTR medium" hereinafter). The discrete track recording system also includes a configuration called a patterned media that has a structure physically shutting off in the circumferential direction of the track. The configuration to be described in the following can be applied to all discrete track recording system physically shutting off in the radial direction even if a configuration is different such as the above noted pattern media, while those are not particularly described herein.

The following is a description of various configurations, in sequence, for making a servo locus of a magnetic head tracing a track formed physically (called "physical track" hereinafter) between two guard bands.

[Measurement Method]

The first is a description of a measurement method of basic information for making a servo locus of a magnetic head tracing a physical track.

The present example takes a displacement of a servo locus (which is called "data track displacement" hereinafter) from the center line of a physical track within a data sector as the target of the measurement, further exemplifying a repeatable run out (RRO) information as the basic information for representing the data track displacement by being discretely digitalized. Note that the trace information used in the following indicates information that is equivalent to RRO information including itself where it is not particularly described.

The following items are prepared when obtaining the RRO information.

The first is a DTR medium which is pre-written by servo information of a sector servo system, or preformatted, on the physical track. The servo information can be written to the DTR medium by a servo track writer for example. Such prepared DTR medium is formed a plurality of servo sectors with the servo information being written therein intermittently on the physical track.

Incidentally, the configuration is such that a user zone (which is called "post code zone" hereinafter), that is freely rewritable by each apparatus of the user's, is allocated to each servo sector, in this event. The servo information within each servo sector is configured not to allow overwrite or erase, with the RRO information being written to the post code zone subsequent to the servo information.

Furthermore, the DTR medium is formed a repeat pattern in the data sector zone between each servo sector. A magnetized state in which magnetized information of the S- and N-poles, for example, is repeatedly written is formed in the data sector zone by performing such as a DC erase or writing a repeat pattern of a predetermined time interval.

Then the DTR medium is equipped on a magnetic disk apparatus.

The magnetic disk apparatus comprises a conventional positioning mechanism by which a servo motor is driven by an electric current, thereby positioning a magnetic head on the DTR medium.

Now, the assumption here is that the servo motor is driven by an electric current, thereby positioning the magnetic head to a certain track in such a comprisal.

As the DTR medium is rotated by rotationally driving a voice coil motor, the magnetic head seeks a designated track and scans on the track according to the servo locus, during which time a DC waveform or an AC waveform is reproduced as the magnetic head passes between the servo sectors (i.e., a data sector) on the DTR medium.

If the magnetic head crosses a guard band line, the amplitude of the DC or AC waveform reproduced by, and transmitted from, the magnetic head reduces in proportion to an overlapping amount with the guard bands.

Therefore, it is possible to judge as for the magnetic head traces the center line of a physical track by the maximum amplitude value of reproduced wave form as a result of the amplitude of the reproduced wave form gaining the maximum value if the magnetic head existing at the center position of the physical track.

The following operation displaces the magnetic head in the radial direction of the DTR medium by changing an offset amount and, during which time, measures an amplitude of the reproduced waveform reproduced from the magnetic head at each point on a servo locus passing the data sector. And the obtained is an offset amount which gains the maximum amplitude at each point on the servo locus. Here, the defined as an offset amount (r) is a variation of the magnetic head moving in the radial direction of the DTR medium in the case of defining a positional difference (i.e., a track pitch) between center lines of adjacent physical tracks as "1", in place of an offset amount in terms of a current value outputting to the servo motor, for the sake of a visual comprehension based on the drawing.

The present embodiment describes a configuration having physical tracks (of the track numbers 1 through Nt from the inner to outer tracks) of the worth of Nt circles (where Nt is an integer) on the DTR medium and a repeat pattern of m cycles (where the m is an integer) is written in each data sector zone. Note that the currently described physical tracks of Nt circles represents the ones for use as data tracks, also with physical tracks existing on the inner- or outer side of these tracks and an m-cycle repeat pattern being likewise recorded therein.

FIG. 2 shows a servo sector and a data sector which are included in one sector length within three adjacent physical tracks in the radial direction of a DTR medium.

FIG. 2 shows guard bands 2 with servo loci as reference, under the assumption of servo loci 1 (i.e., 1-1, 1-2 and 1-3) being straight. Consequently, the guard bands 2 are each shown by a state of waving as opposed to the servo locus 1. Between these guard bands 2 are placed servo sectors 3 (i.e., 3-1, 3-2 and 3-3) and data sectors 4 (i.e., 4-1, 4-2 and 4-3) alternatively, and each of the data sectors 4 is recorded an m-cycle repeat pattern from the left to right, in the showing of FIG. 2, and across the guard bands 2.

Note that FIG. 2 designates a position y on the servo locus in the horizontal axis and an offset amount r=d(y) for varying the magnetic head in the vertical axis. The offset amount r shown in FIG. 2 is not the length of a pitch of the guard band, but is of a scale with the pitch being "1".

The magnetic head 5 scans in a manner to trace the servo locus, which is shown by the chained line in FIG. 2, from the left to right as indicated by the solid line arrow. Here, the description is of the physical track nt (where, $1 \leq nt \leq Nt$) at the center as the target track among the three. The description is the same for the other physical tracks.

Now, the operation is to make the magnetic head scan within the data sector zone by moving the magnetic head in steps in the radial direction (i.e., the positive and negative direction of the axis d) of the DTR medium in order to obtain a maximum amplitude value of a reproduction signal reproduced from the magnetic head 5, in this event. FIG. 2 lets two kinds of dotted line arrows indicate respective loci of the magnetic head in the case of changing the offset amount upward and downward in two steps each from the center of the servo locus (which is a servo reference locus, shown by a solid line arrow in FIG. 2). One of them indicates the case of displacing a 30% width in the upward and downward directions, while the other indicates the case of displacing a 60% width in the upward and downward directions, where a track pitch in the radial direction of the DTR medium is defined as "1" (which is defined as 100%).

In order to obtain the center of a physical track more accurately, it is necessary to make the magnetic head position itself at a discretionary position between the nt−1-th servo locus and nt+1-th servo locus, where a track (of the track number nt) as the current target of positioning is defined to be the basis. Consequently, an offset amount r is desirably to be changed in the finest possible steps within the range of $-1 \leq r \leq 1$. For example, it is possible to position the magnetic head at the right center (nt+0.5) between the nt-th servo locus and nt+1-th servo locus by adding an offset r=0.5 to a positioning target value at a position where the center line of the servo locus overlaps with that of the physical track.

Focusing on a reproduction signal of the repeated pattern reproduced from the magnetic head 5 as described before, the amplitude value of the reproduction signal decreases when the magnetic head passes above the guard band 2. In other words, the amplitude of the reproduction signal indicates the maximum value when the magnetic head passes the center of the physical track. That is, the reproduction signal read from the magnetic head 5 along the servo locus accompanies an amplitude variation in proportion with the displacement from the center line of the physical track.

Therefore, in the case of giving an offset to the servo locus in the radial direction of the DTR medium, a positional relationship between a servo locus of the magnetic head, which scans with the offset amount, and the center line of a physical track also varies, and therefore an amplitude variation of the reproduction signal of the above described repeat pattern reproduced by the magnetic head also varies.

FIG. 3 shows an amplitude variation profile of a repeat pattern reproduction signal obtained from a magnetic head in the case of displacing it in the radial direction of a DTR medium by the offset amounts of 0%, ±30% and ±60% (which is carried out by supplying a servo motor with current values corresponding to the respective offset amounts), and making it scan within a data sector of the nt-th track number. Note that FIG. 3 shows only the amplitude variation in the range of one data sector length corresponding to FIG. 2. The left end of the waveform of FIG. 3 corresponds to the left end of the data sector of FIG. 2, and the right end of the waveform corresponds to the right end of the data sector of FIG. 2. Meanwhile, the up and down direction of FIG. 3 shows a variation amount of the amplitude.

As shown in FIG. 3, the amplitudes of reproduction signals obtained from the magnetic head which is displaced by the respective offset amounts (i.e., ±30% and ±60%) to the radial direction of the DTR medium, with the servo locus being the reference, vary in individual positions on the data track. For example, the amplitude obtained from the magnetic head of a 0% offset amount gains the maximum amplitude value in its reproduction signal because the magnetic head is positioned at the center line of the physical track at the start position (on the left end of FIG. 3) as shown in FIG. 2, followed by being varied, that is, the amplitude values are decreased or increased by an influence of a wavy guard band as the magnetic head moves toward right in the showing of FIG. 2. Comparably, the amplitude obtained from the magnetic head with other offset amounts have amplitude values which be different respectively as compared to the one with 0% offset amount, because the positional relationship between the guard band and the magnetic head changes even at the same position in the data track direction. Therefore, the above described amplitude variation indicates different variation, respectively, depending on the offset amounts.

Figure 4:
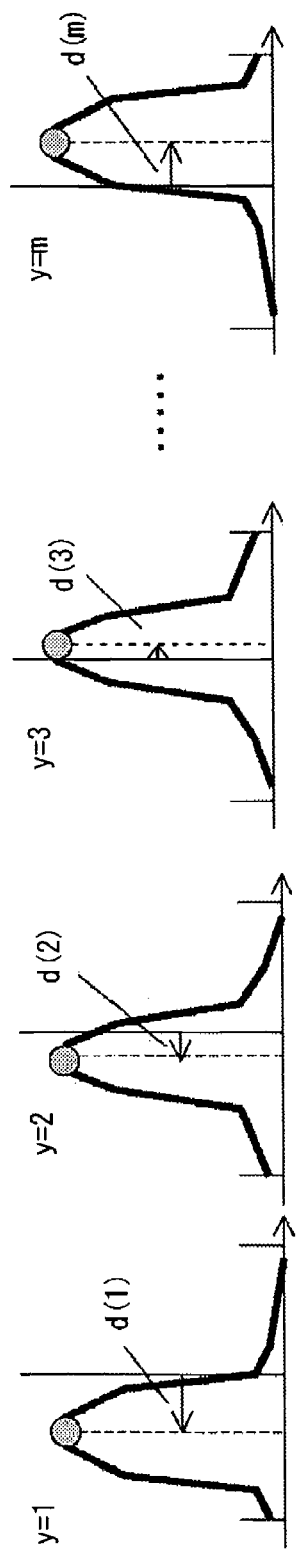
FIG. 4 shows a waveform cross-sectional diagram of amplitude variation profiles, on the axis d (y) at each point (y) on a servo locus, obtained by varying offset amounts r in a range of plus or minus 100%.

FIG. 4 shows a waveform cross-sectional diagram of amplitude variation profiles, on the axis d (y) at each point (y) on a servo locus which is obtained by varying offset amounts r in a range of plus or minus 100%.

FIG. 4 shows a waveform cross-section at each point of m-divisions, dividing a range of a servo locus within the data sector into m-number of parts (where the m is an integer).

As is apparent from FIG. 4, at least one maximum amplitude value must exist in each wave form cross-sectional diagram, it is therefore possible to obtain an offset amount d(y) from the maximum amplitude value corresponding thereto.

Incidentally, the y=1 (which is a position allocated first from the start position of a data sector) shows an offset amount d(1), while the other positions show respectively different offset amounts in FIG. 4.

Figure 5:
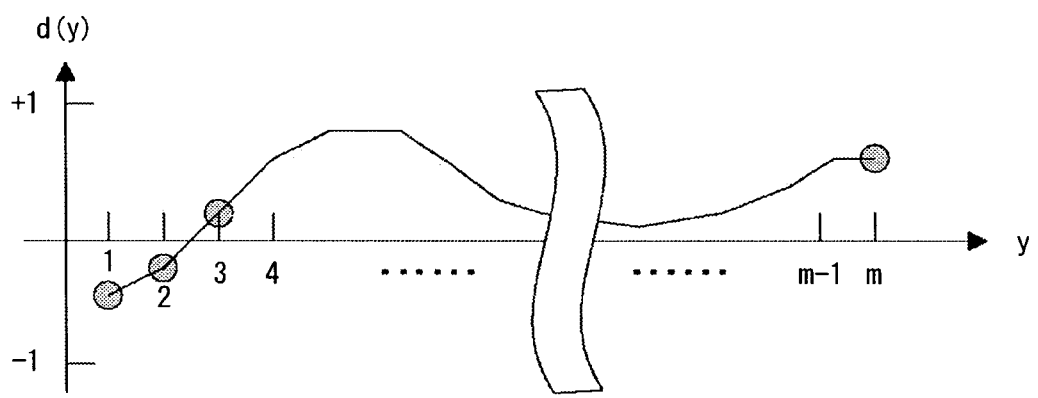
FIG. 5 is a graph showing a relationship between a position y and an offset amount r gaining the maximum amplitude value.

FIG. 5 is a graph showing a relationship between the maximum amplitude value and an offset amount r at a position y.

Because the position of the magnetic head shifted by an offset amount, which gains the maximum amplitude of a reproduction signal, corresponds to the center line of a physical track as described above, a "waviness" resulting from connecting each plot of the graph shown in FIG. 5 is equivalent to the center line of the physical track and also indicates a feature of a guard band.

A specific offset amount thusly collected at each position within a data sector is utilized as RRO information which is handled by the present measurement method as the target of obtainment.

Note that while the above described embodiment divides a data sector zone (which is a servo locus within a data sector zone in a strict sense) into m parts and obtains an offset amount at each position, an average value may be used, however. In the case of calculating offset amounts at four positions for example, they may be calculated by taking m=4, or dividing y(1) through y(m) into four groups sequentially from the top by taking m>4 and the average of each group may be used as the offset amount within the group. Also in the case of taking m=1, the effect shown by the present embodiment can be obtained.

The next is to write the thusly obtained offset amount at each point between data sectors to the post code zone within the servo sector as RRO information.

The configuration is such as to apply the above described operation to all sectors within the same track and to all other tracks including data sectors, and record offset amounts of the entire surface of each servo sector of a DTR medium as RRO information in each servo sector thereof.

The above described processes enable each magnetic disk apparatus to record, in an equipped DTR medium, correction information for the magnetic head tracing the physical track of the DTR medium.

[Measurement Record Apparatus]

The next description exemplifies a measurement record apparatus measuring a displacement of a data track by the above described measurement method and recording the displacement amount as RRO information in a DTR medium. The present embodiment uses a magnetic record apparatus as the aforementioned measurement record apparatus.

Figure 6:
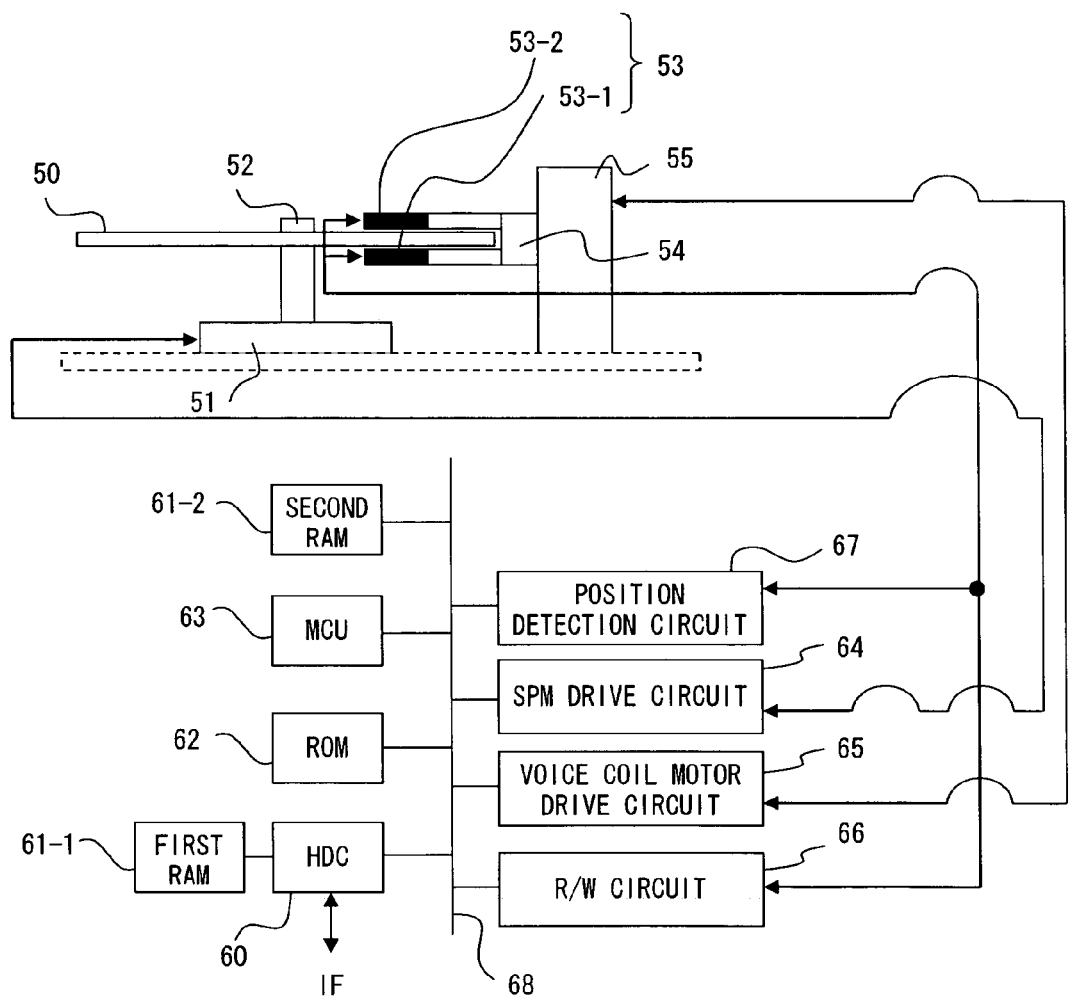
FIG. 6 shows a configuration diagram of a measurement record apparatus.

FIG. 6 shows a configuration diagram of a magnetic record apparatus.

The upper part of FIG. 6 shows an illustrative exact side view of an internal configuration of the magnetic record apparatus, while the lower part shows a block diagram of a circuit for controlling the respective units.

The DTR medium 50 prior to writing RRO information is mounted onto a rotation shaft 52 of a spindle motor 51.

The spindle motor 51 comprises the rotation shaft 52 pointing upward in the showing of FIG. 6 and is disposed to transmit a rotation of the spindle motor 51 to its rotation shaft 52, and rotate the DTR medium 50 around the centers of the spindle motor 51 and rotation shaft 52.

Writing information to, and reading it from, the upper and lower surfaces of the DTR medium 50 are carried out by way of magnetic heads 53 (i.e., 53-1 and 53-2) which are equipped for the upper and lower surfaces respectively.

The magnetic head 53 converts information which is already written to a servo sector or a data sector of the DTR medium 50 into an electric signal and imports it to an internal circuit (shown in the lower part of the drawing), or converts writing data consisting of an electric signal into magnetic data and make a writing zone of the DTR medium generate a magnetic flux, thereby magnetizing the writing zone to information of the writing data.

Both of the magnetic heads 53 are fixed onto one arm 54 which is connected to a voice coil motor 55 whose driving by a current enables the above described magnetic heads 53, while magnetic heads 53 float over, the DTR medium 50, to operate in the radial direction thereof so as to cross the physical track by a predetermined locus. Note that a configuration of an actuator is discretionary, including a linear actuator, a rotary actuator, et cetera. The present embodiment is described by assuming that the magnetic heads 53 crosses each physical track on the DTR medium 50 approximately perpendicularly for the sake of convenience.

The lower part of FIG. 6 shows a block diagram of a circuit for controlling the above described respective units.

The circuit comprises a hard disk controller (HDC) 60, first random access memory (RAM) 61-1, second RAM 61-2, read only memory (ROM) 62, a micro controller unit (MCU) 63, a spindle motor (SPM) drive circuit 64, a voice coil motor drive circuit 65, a read/write (R/W) circuit 66, a position detection circuit 67 and a bus 68 interconnecting the aforementioned components.

The HDC 60 performs a communication with a host by way of an interface IF, such as ATA and SCSI, and controls a data recording to a predetermined sector on the DTR medium 50 or a data reproduction from the sector based on an instruction from the host for the data recording or data reproduction. An example it transmits a command to the MCU 63 for making it execute various programs and instructs the R/W circuit 66 for a data recording and/or data reading when the magnetic head 53 moves to a target sector number. Incidentally, data exchanged in this event is temporarily stored in the first RAM 61-1.

The second RAM 61-2 temporarily stores an Operation result at the MCU 63.

The ROM 62 stores a control program for the MCU 63, a program for firmware, et cetera.

The MCU 63 executes a control program and a program for firmware, et cetera, stored by the ROM, thereby starting and controlling the spindle motor (SPM) drive circuit 64, voice coil motor drive circuit 65, position detection circuit 67, R/W circuit 66, et cetera.

This control, for example, detects the current position of the magnetic head 53 from a position signal output from the position detection circuit 67, and drives and controls the voice coil motor to a target position from an error between the detected current position and target position. It also drives and controls the voice coil motor according to a later described offset amount.

The SPM drive circuit 64 drives, by a current, the spindle motor 51.

The voice coil motor drive circuit 65 drives, by a current, the voice coil motor 55.

The read/write (R/W) circuit 66 controls information reading and writing for the magnetic heads 53 at the DTR medium 50.

The position detection circuit 67 extracts a position signal by demodulating servo information reproduced by, and transmitted from, the magnetic head 53, and transmits the position signal to the MCU 63.

FIG. 7 is a sector placement diagram of a DTR medium 50 which is set in the above noted magnetic record apparatus.

FIG. 7 shows a drawing of the DTR medium 50 viewed from its writing and reading surface, with the surface exhibiting placement of sectors.

It is apparent from FIG. 7 that a plurality of physically cutoff tracks (i.e., physical tracks) 501 is generated as a result of a plurality of guard bands 500 being formed in equal intervals from the center toward outer periphery of the present DTR medium 50. Further shown is the state of a plurality of servo sectors 502 being formed in equal intervals on each physical track 501. In the present example, the servo sectors 502 are formed radially on the surface of the DTR medium 50. Note that the dotted lines shown along the guard bands 500 shown in FIG. 7 indicate the center lines of the physical tracks.

Figure 8:
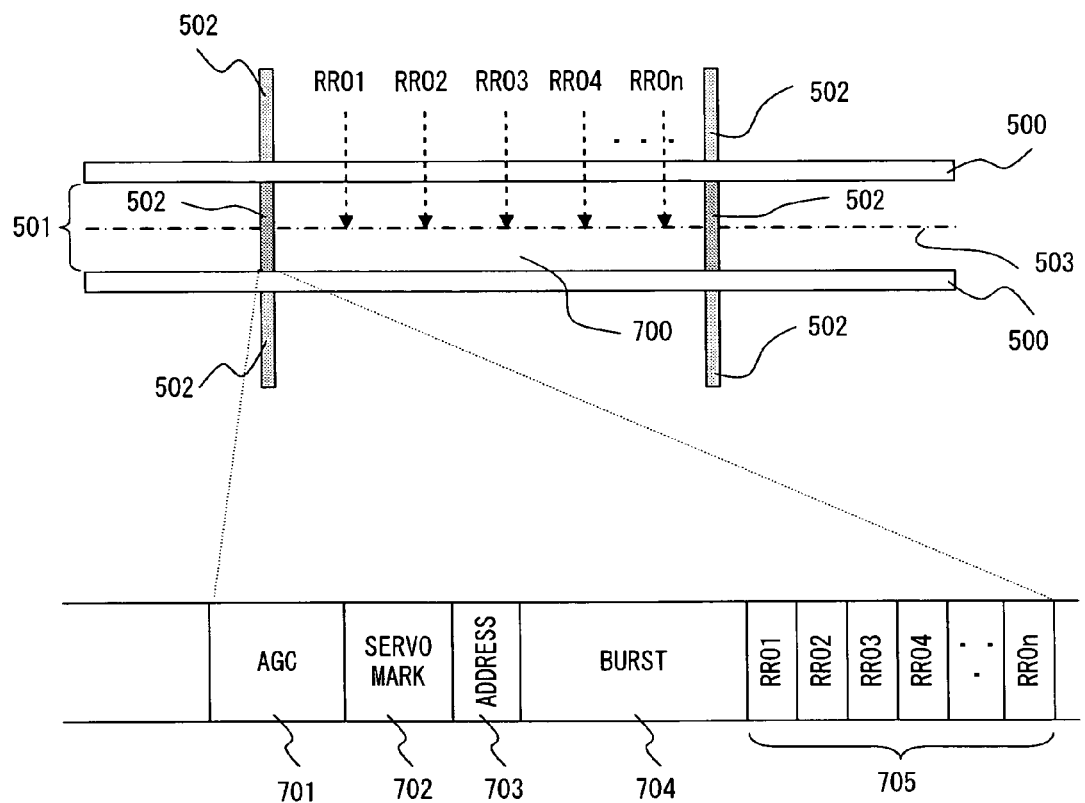
FIG. 8 is an enlarged diagram of one sector on a DTR medium 50.

FIG. 8 is an enlarged diagram of one sector formed on a DTR medium 50 shown by FIG. 7 and the surrounding.

The present example shows the guard band 500 as being straight, contrary to FIG. 2. As shown in FIG. 8, one sector comprises a servo sector 502 and a data sector 700.

The servo sector 502 records servo information, showing a format example of the servo sector 502 by enlarging it in FIG. 8.

A format of the servo sector 502 of the present embodiment is constituted by an AGC 701, a servo mark 702 for indicating a start of servo information, an address 703 having information of a modulated track number and servo sector number, a burst 704 having information for correcting a displacement of the adjacent servo sector from a servo locus and a user zone 705 divided into n zones, i.e., RRO 1 through RRO n, for writing attendant information generated from the aforementioned information. Among these, the zones from the AGC 701 through the burst 704 are conventional servo information written by a servo track writer, or storage zone for servo information preformatted at the time of producing the media and therefore the present disk apparatus is not allowed to write to, or erase, these zones.

The values stored in the zones RRO 1 through RRO n within the above noted user zone 705 are set as values (i.e., RRO information) for correcting servo loci at n positions (i.e., RRO 1 through RRO n) indicated within the data sector 700 which is indicated subsequently to the servo sector 502.

The next description is of means for measuring and for recording RRO information (i.e., RRO 1 through RRO n) at the above noted n positions.

The present embodiment is configured to equip this means on the above noted magnetic disk apparatus as a program for firmware, an alternative configuration, however, may set up the magnetic disk apparatus in a recording mode for the RRO information, followed by equipping as firmware for a self adjustment function for starting the RRO recording simultaneously with the startup.

Figure 9:
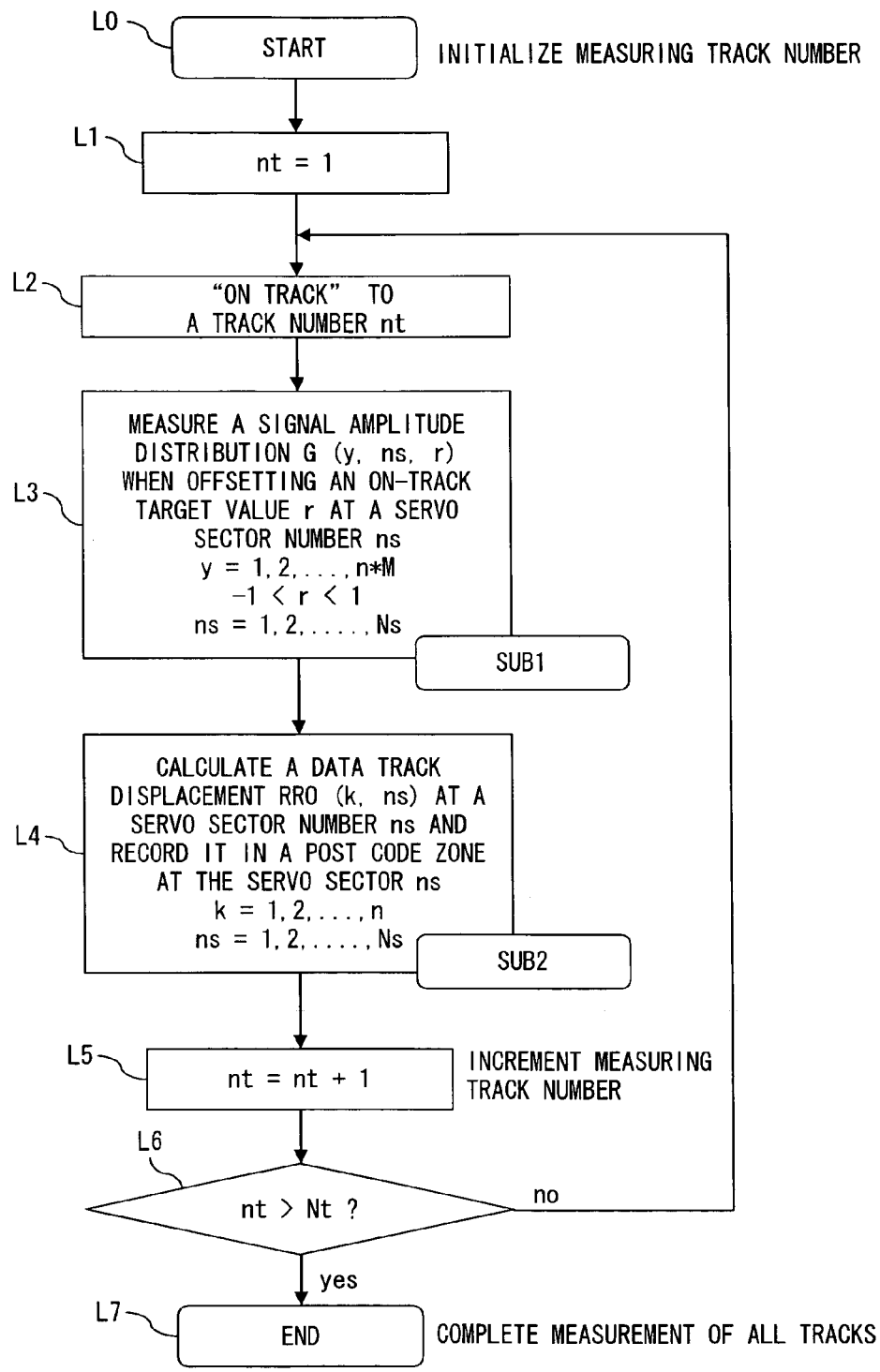
FIG. 9 is a main flow chart of a generation program.
Figure 10:
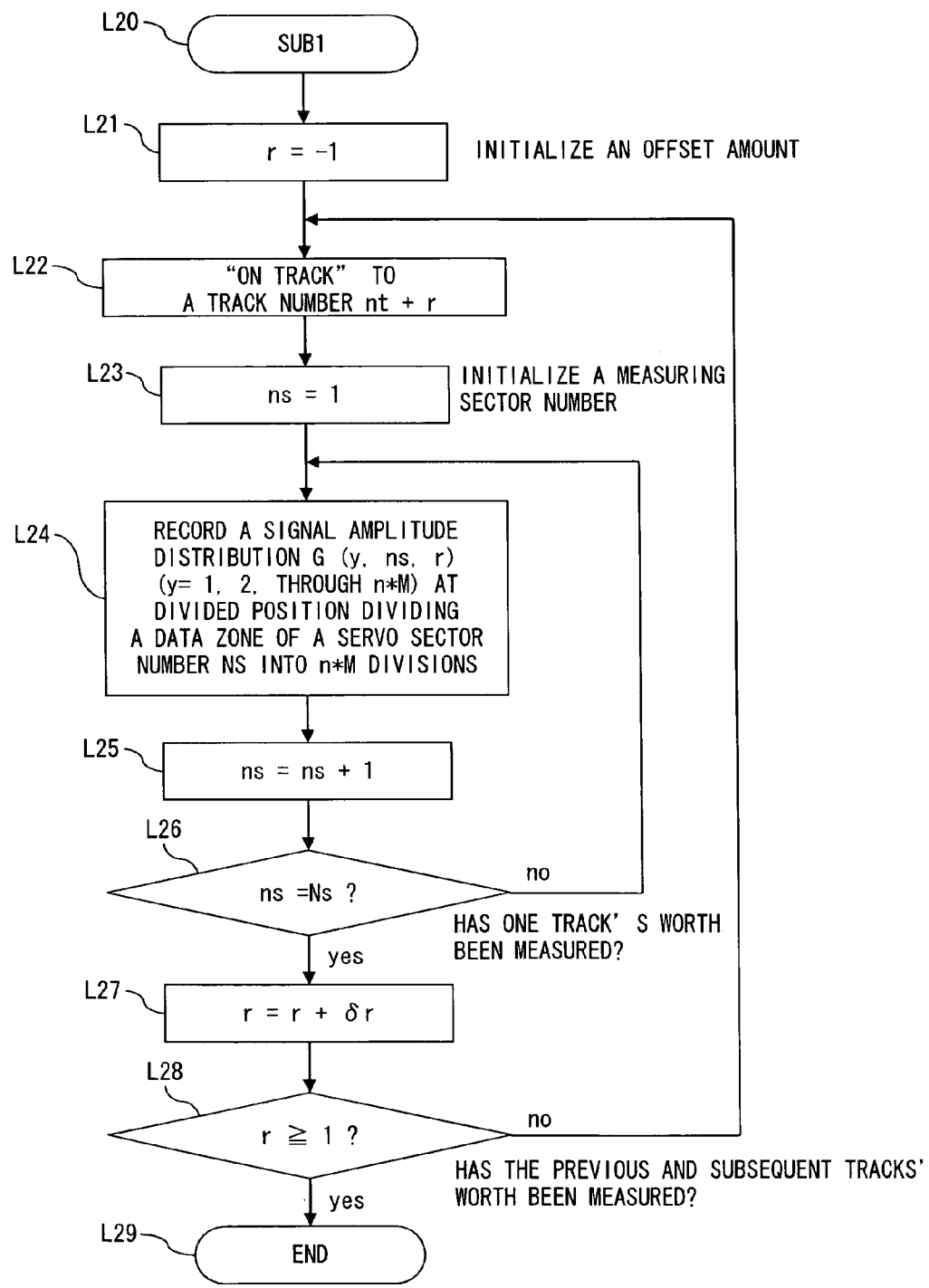
FIG. 10 is a flow chart of a subprogram showing an internal operation of a step L3.
Figure 11:
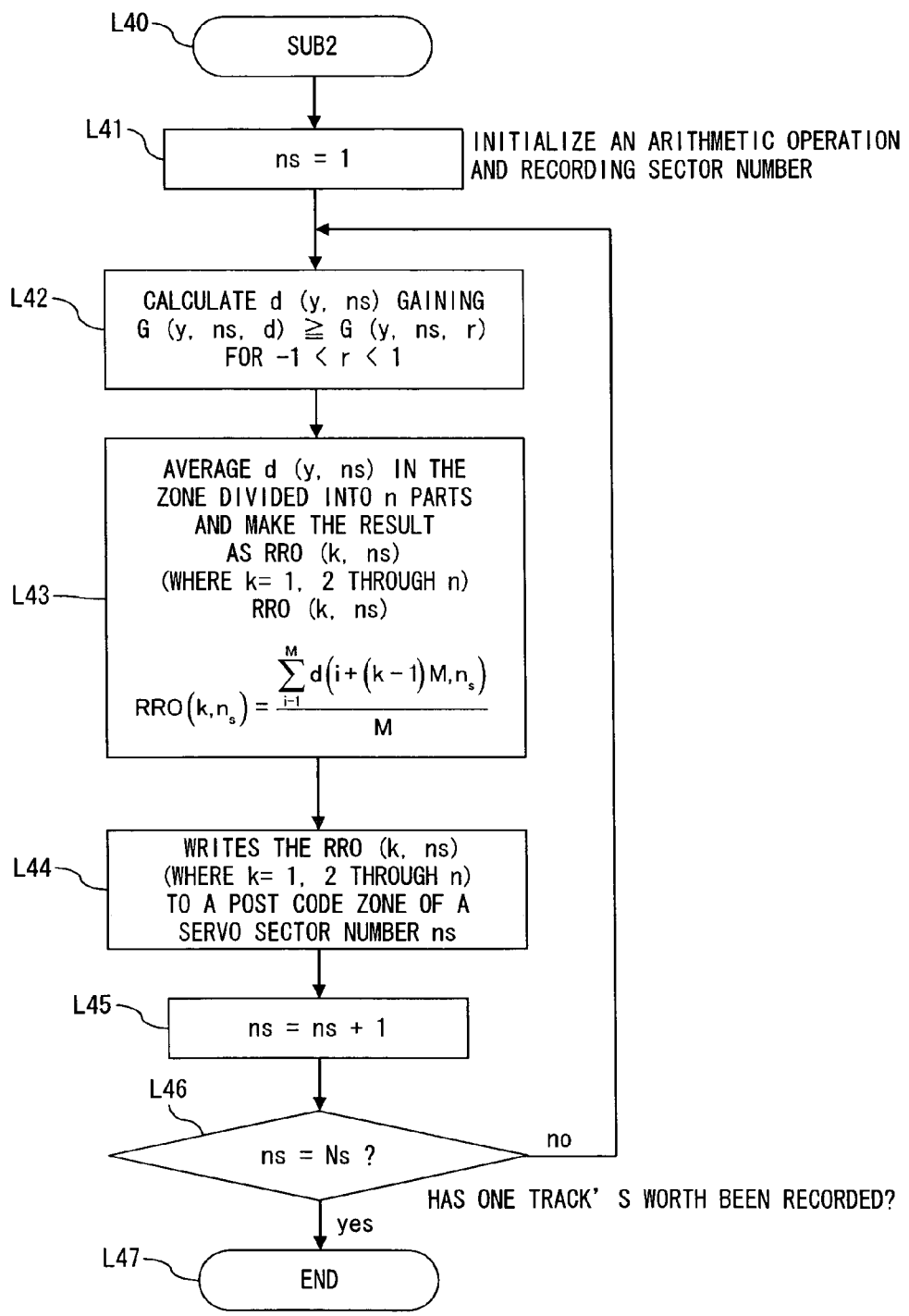
FIG. 11 is a flow chart of a subprogram showing an internal operation of a step L4.

FIGS. 9 through 11 show a flow chart of a program (i.e., a generation program) for measuring the above noted trace information and recording it to a DTR medium.

FIG. 9 is a main flow chart of the aforementioned generation program, while FIGS. 10 and 11 show its sub-flow chart.

The process shown in each step of the aforementioned generation program is started by a host computer, which is connected to the above noted magnetic disk apparatus, transmitting a command, thereby the MPU reading the related program from the ROM and executing it while properly controlling each unit.

As the program is started (step L0; simply "L0" hereinafter), following executing an initial process (e.g., a startup of the spindle motor and a loading of the magnetic head), which is not shown in the flow chart, the program initializes a variable nt (where nt=1, 2 through Nt), to "1", of a track number as the target of measurement (L1).

Then, it makes the magnetic head be "on track" to a measurement target track (i.e., a track of the track number nt) (L2). The on-track process controls driving the servo motor according to a comparison of servo information recorded on the DTR medium, which is reproduced from the magnetic head with a track number of the above noted measurement target, thereby making the magnetic head be "on track" to the measurement target track. Note that the nt=1 at the initial stage, which is the same in the following embodiments.

Subsequently, the program measures a signal amplitude distribution G (y, ns, r) within a range of each data sector when offsetting an on-track target value (i.e., a value on a conventional servo locus at the data sector start point) by the current setup in the range of a value r (where, $-1 \leq r \leq 1$) for each sector (i.e., of a sector number ns (=1, 2, through Ns)) on the track (of the track number nt) (L3). Note that the y is a value corresponding to a position of each point in the case of dividing the zone of a data sector subsequent to a servo sector of the servo sector number ns into m(=n*M) pieces of zones along a servo locus. Then indicates the number of RRO values recorded in a post code zone of one servo section, while the M is an integer. That is, the number of zone divisions of one data sector is set to an integer times the number of RRO zones included in a servo sector which is paired with the data sector. The above described measurement is carried out by applying a sequential drive control to the servo motor in such a manner that a servo locus of the magnetic head varies by an offset amount r in the radial direction of the DTR medium, and positioning the magnetic head at a position varied by the offset amount r.

Further subsequently, the program calculates data track displacement information RRO (k, ns) (where k=1, 2 through n) of the data sector zone subsequent to the servo sector of the track number nt and servo sector number ns based on the signal amplitude distribution G (y, ns, r), which has been measured in the step L3, and records the calculated RRO value in the post code zone of the servo sector. The calculated RRO value moves the magnetic head to a zone of a predetermined number within an RRO zone within the data sector, followed by writing the aforementioned RRO value, following an electromagnetic conversion thereof, as magnetization information, at the aforementioned zone.

It carries out the above described operation for the ns=1, 2, through Ns (where the Ns is the number of servo sectors within one track) and records the RRO data for one circumference of a track in the DTR medium (L4).

Then, having completed the measurement and recording of the RRO data for one circumference of the track in the steps L3 and L4, the program increments the track number nt by "1" (L5).

Then it judges whether or not the track number nt has reached all the track numbers Nt (L6).

If the track number nt has not reached Nt, the program returns the process to the step L2, and performs measuring and recording of RRO data of the subsequent track. Contrarily, if the judgment is the completion of recording RRO data of all the track numbers, the program ends (L7).

FIG. 10 is a flow chart of a subprogram showing an internal operation of the step L3 for measuring a signal amplitude distribution G of a data sector zone.

As the subroutine is started in the step L20, the program first initializes an on-track target offset r to "−1" (minus one) (L21).

It makes the magnetic head be "on track" to a track number nt+r which is a target track number nt that is displaced by an offset amount r (L22).

Then, it initializes a variable ns, as a measurement target sector number, to "1" (L23).

Then the program measures a signal amplitude distribution G(y, ns, r) at each divided position y (where, y=1, 2 through m) when dividing a data sector zone, which is subsequent to a servo sector, into m=n*M pieces of zones in the track number nt+r and servo sector number ns and stores it in RAM, et cetera (L24).

Then it increments a value of a servo sector number ns by "1" (L25), and judges whether or not the ns has reached the servo sector number Ns for one track's worth (L26).

If the judgment is "no" in the step L26, the program returns to the step L24 and measures a signal amplitude distribution G of the servo sector. While, if the judgment is "yes" in the step L26, it increases the offset r by δr (L27).

Then it judges whether or not the r has reached "1" (L28).

If the judgment is "no" in the step L28, the program returns to the step L22 and repeats the processes from the step L22 through L28 for measuring a signal amplitude distribution G at new offset r of the worth of one track. Contrarily, if the judgment is "yes" in the step L28, the program ends the measurement of a signal amplitude distribution G (y, ns, r) of the worth of one track (where −1≦r≦1; y=1, 2, through m; ns=1, 2, through Ns) in order to indicate the offset r has been varied from "−1" to "1" (L29), followed by shifting to the process of the step L4 in the main flow chart.

FIG. 11 is a flow chart of a subprogram showing an internal operation of the step L4 for performing an operation and recording of RRO data of the worth of one track.

Having started this subroutine in the step L40, the program first initializes a variable ns, to "1", of a servo sector number (L41).

Then, it calculates an r=d (y, ns) gaining a maximum value of a signal amplitude G based on a signal amplitude G (y, ns, r), which is stored in RAM, corresponding to the servo sector number ns (L42). Note that the thusly calculated offset r constitutes a data track displacement amount in the data sector zone.

Then, the program averages the value r=d (y, ns) (where y=1, 2 through m) for each M=m/n pieces as shown by the following expression 1, thereby obtaining n pieces (corresponding to the number of RRO zones on a DTR medium) of RRO data (L43).

[Expression 1]

$$Pro(k,ns) = (1/M) \times \Sigma^{M}_{i=1} d[i+(k-1)M,ns];$$

where k=1, 2 through n.

Then, it writes the n pieces of RRO data obtained in the step L43 to the corresponding zone of each piece of RRO data within the post code zone of a servo sector number ns (L44). This results in writing, to the post code zone of the servo sector number ns, data track displacement information of each divided zone when dividing the data sector zone into n parts.

Then, it increments a value of the servo sector number ns by "1" (L45), and judges whether or not the ns has reached a servo sector number Ns which is worth one track (L46).

If the judgment is "no" in the step L46, the process returns to the step L42 and carries out a calculation and recording of RRO data of the servo sector. Contrarily, if the judgment is "yes" in the step L46, the present subroutine is ended (L47) and the program shifts to the process of the step L5 of the main flow chart (refer to FIG. 9).

As described above, the execution of the processes shown by FIGS. 9 through 11 enables a generation of a DTR medium on which RRO information is written for each sector.

[Magnetic Disk Apparatus]

The next description is of a comprisal of a magnetic disk apparatus, being equipped with the above noted DTR medium to which RRO information is written, controlling positioning of a magnetic head on the DTR medium by using the RRO information. Note that a configuration of the magnetic disk apparatus is approximately the same as the one shown in FIG. 6, and that the following describes a positioning control system in detail where the aforementioned configuration does not show.

First Embodiment

Figure 12:
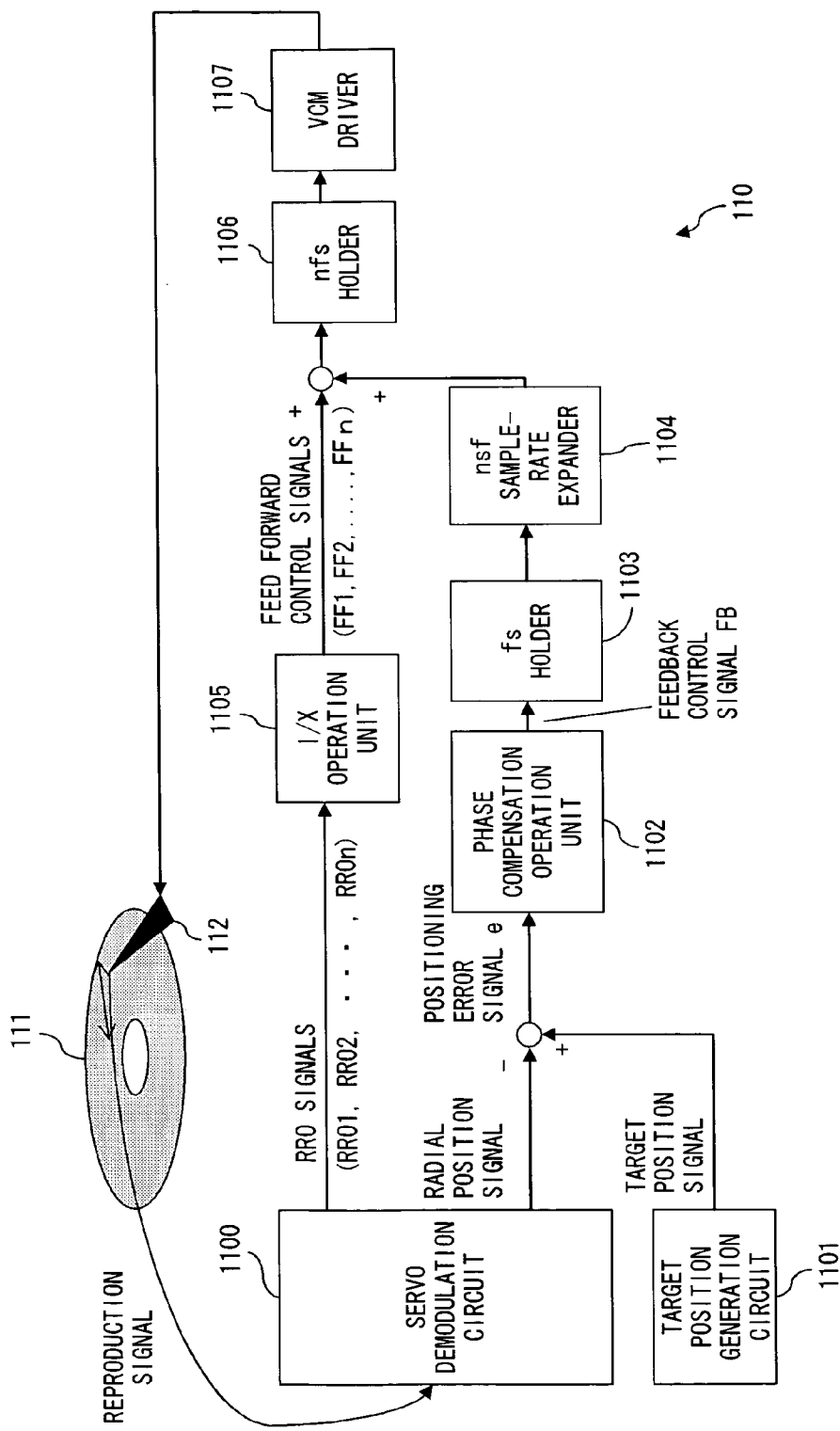
FIG. 12 is a block diagram of a positioning control system according to a first embodiment.

FIG. 12 is a block diagram of a positioning control system constituting the magnetic disk apparatus.

FIG. 12 shows a positioning control circuit 110 for controlling a scan position of a magnetic head 53 on a physical track, a DTR medium 111 recording information (i.e., servo information, RRO information, et cetera) input to the positioning control circuit 110 and a positioning mechanism 112 (refer to the component numbers 54 and 55 shown in FIG. 6) comprising the magnetic head 53 which is a control target of the positioning control circuit 110. Incidentally, FIG. 12 illustratively shows the DTR medium 111 and positioning mechanism 112 comprising the magnetic head.

The positioning control circuit 110 comprises a servo demodulation circuit 1100, a target position generation circuit 1101, a phase compensation operation unit 1102, an fs holder 1103, an nfs sample-rate expander 1104, an I/X operation unit 1105, an nfs holder 1106 and a voice coil motor (VCM) driver 1107.

The servo demodulation circuit 1100 is a circuit for demodulating radial position information and RRO information from a reproduction signal of the magnetic head, and outputting these pieces of information as signals. The magnetic head reproduces an electric signal from each piece of information of each servo sector of the DTR medium in a sequence as exemplified by the servo sector format shown in FIG. 8, while the servo demodulation circuit 1100 demodulates the electric signal for obtaining information (i.e., a radial position signal) of the address part and burst part, and also demodulates information (i.e., RRO information) of the post code part in sequence starting at n=1. The radial position signal is output for every scan of one servo sector by the magnetic head. The RRO information is outputted n times for every scan of one servo sector by the magnetic head.

The target position generation circuit 1101 is a circuit for generating target position information (i.e., information consisting of target track number and an offset value) of the destination that the magnetic head moves to.

The above noted demodulated radial position signal is applied by an operation to a difference with the target position signal outputted in the event and the resultant difference signal (i.e., the positioning error signal e) is input to the phase compensation operation unit 1102 at the later stage.

Here, the positioning error signal e is a signal output as one sample output by one servo sector (the sampling frequency in this event is defined as fs). Meanwhile, an RRO signal is a signal output as n sample outputs by one servo sector (the sampling frequency in this event is defined as nfs). For instance, in the case of recording four pieces of RRO information to a post code zone of a DTR medium, n=4, and therefore it is a signal of a sampling frequency (4 fs) outputting four sample outputs for one servo sector.

The phase compensation operation unit 1102 performs phase compensation and gain adjustment of the positioning error signal e and outputs the resultant signal (i.e., a feedback control signal FB) to the fs holder 1103 at a later stage.

The fs holder 1103 holds the feedback control signal FB by the sampling frequency fs and outputs the holding signal to the nfs sample-rate expander 1104.

The nfs sample-rate expander 1104 converts the signal of the frequency fs into a frequency of n times (that is a frequency nfs).

The I/X operation unit 1105 converts n pieces of RRO signals (i.e., RRO 1, RRO 2 through RRO n) output from the servo demodulation circuit 1100 into a VCM drive current to generate feed forward control signals FF 1, FF2 through FF n. As opposed to the RRO signal being a positional signal, the input to the VCM driver is a current signal, and therefore the I/X operation unit 1105 is provided with the inverse function of a transmission function between the VCM drive current and radial position of the magnetic head, thereby multiplying an inverse characteristic of an actuator. This configuration is to displace a servo locus of the magnetic head by the offset amount which has been calculated at the time of measuring an RRO signal.

A feedback control signal FB raised to the sampling frequency nfs is added to the feed forward control signals FF 1, FF2 through FF n, in sequence, of n samples which are sequentially outputted by one servo sector, followed by the nfs holder 1106 holding them at the sampling frequency nfs.

The VCM driver 1107 drives the servo motor by a current at the sampling frequency 4 fs with the signal being held by the nfs holder 1106 as the instruction signal.

Figure 13:
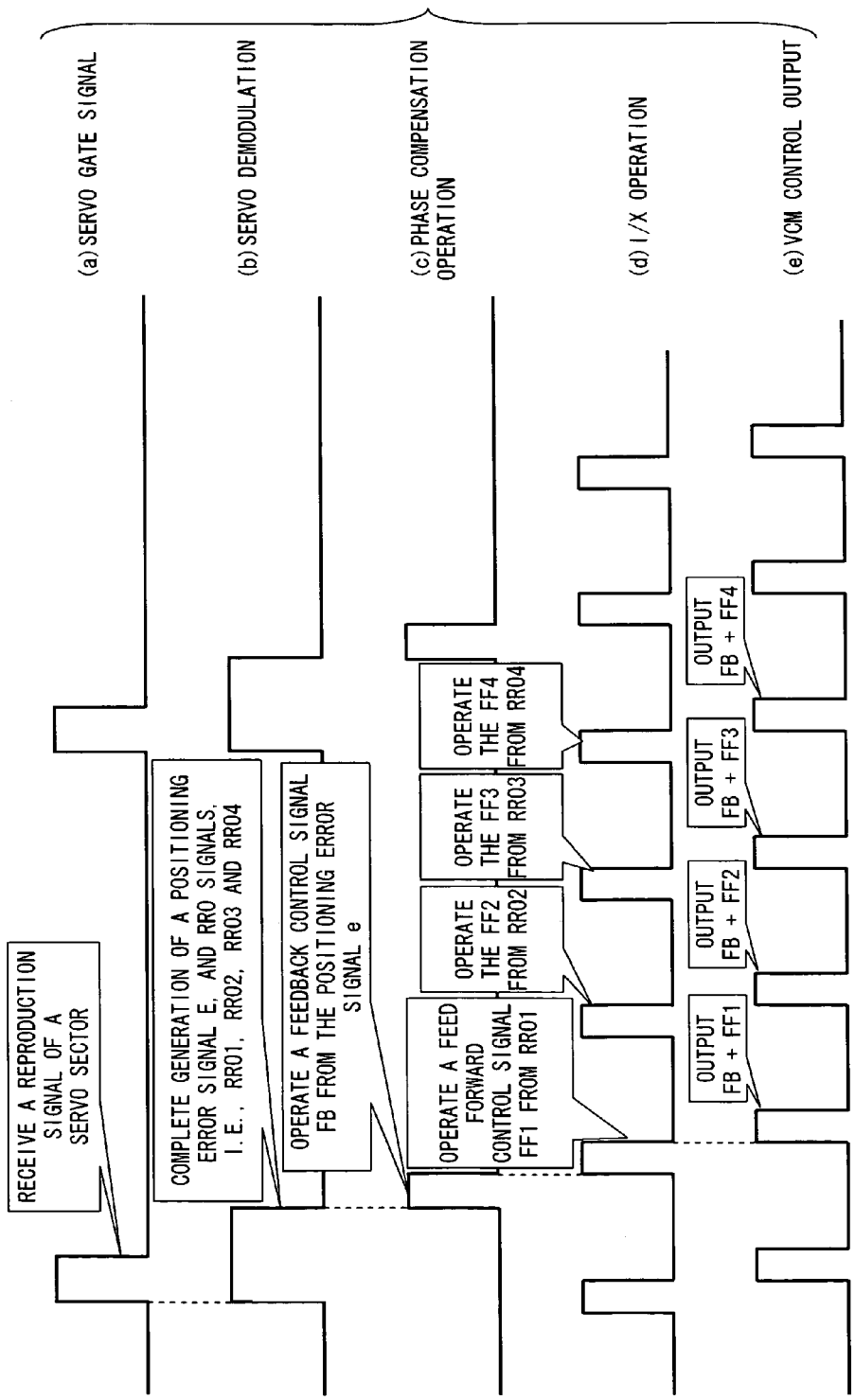
FIG. 13 is a timing chart of a positioning control system.

FIG. 13 shows a timing chart of the above described control system. Note that the present embodiment shows a timing of each signal by exemplifying an n=4.

The paragraph (a) shown in FIG. 13 is a servo gate signal which is configured to open at the timing of detecting a servo sector.

The paragraph (b) shown in FIG. 13 shows a servo demodulation operation, indicating the time from a servo sector being detected followed by demodulating a reproduction signal as following specified format until a close of the servo gate signal and outputting one radial position signal and n pieces of RRO signals. The present embodiment is formatted for outputting four RRO signals.

The paragraph (c) shown in FIG. 13 shows an operation of a phase compensation operation, indicating the time from operating a positioning error signal e, which is the difference between a target position signal and a demodulated radial position signal, followed by applying a phase compensation operation such as a phase-lead filter until outputting a feedback control signal FB.

The paragraph (d) shown in FIG. 13 shows an operation of I/X operation, indicating the time from converting RRO 1, which is the first RRO signal demodulated, into an electric current signal for driving the VCM until converting to a feed forward control signal FF1. Since the RRO signal is supplied by a frequency 4 fs which is four times a frequency fs in which a servo gate opens, the modulated second through fourth RRO signals (i.e., RRO 2, RRO 3 and RRO 4) are also sequentially applied by the I/X operation at the timing as shown in FIG. 13 (d), thereby being converted into the feed forward control signals FF 2, FF 3 and FF 4.

The paragraph (e) shown in FIG. 13 shows a VCM drive signal output, indicating the timing for sequentially outputting by adding one feedback control signal FB, which has been operated for one servo sector, to four feed forward control signals FF 1, FF 2, FF 3 and FF 4, respectively. The above described process enables the magnetic disk apparatus to trace the magnetic head to a physical track based on the RRO information on the DTR medium.

Note that the above described embodiment shows a usage example of a DTR medium recording RRO information obtained by a measurement in the post code zone of a servo sector as the target of the measurement, an alternative configuration, however, may be such as to record the RRO information obtained by the measurement in the post code zone of a servo sector which is on this side of the measurement target servo sector by N sectors at the time of recording the RRO information and use the DTR medium. A value of the N in this case may be freely designated according to a control band of a magnetic head positioning mechanism.

Or, grasping RRO information as a continuous data of the worth of one track circumference, a configuration may be to apply a phase-lead compensation according to a control band of the magnetic head positioning mechanism, followed by recording the RRO information anew in each servo sector of the track, and use thusly generated DTR medium.

Or, in the case of measuring, and recording, a displacement of a data track of each servo sector, a configuration may be to use a DTR medium by dividing the recording zone of a magnetic disk medium into a plurality of zones according to the radial position, and recording an average values within the divided zone or a linear compensation of the average values.

Second Embodiment

The first embodiment has shown the configuration of outputting a signal of n (which is a fixed value) samples by each sector, an alternative configuration, however, may be variable according to a displacement value or a radial position of a data track in lieu of a fixed value in the aforementioned event.

Figure 14:
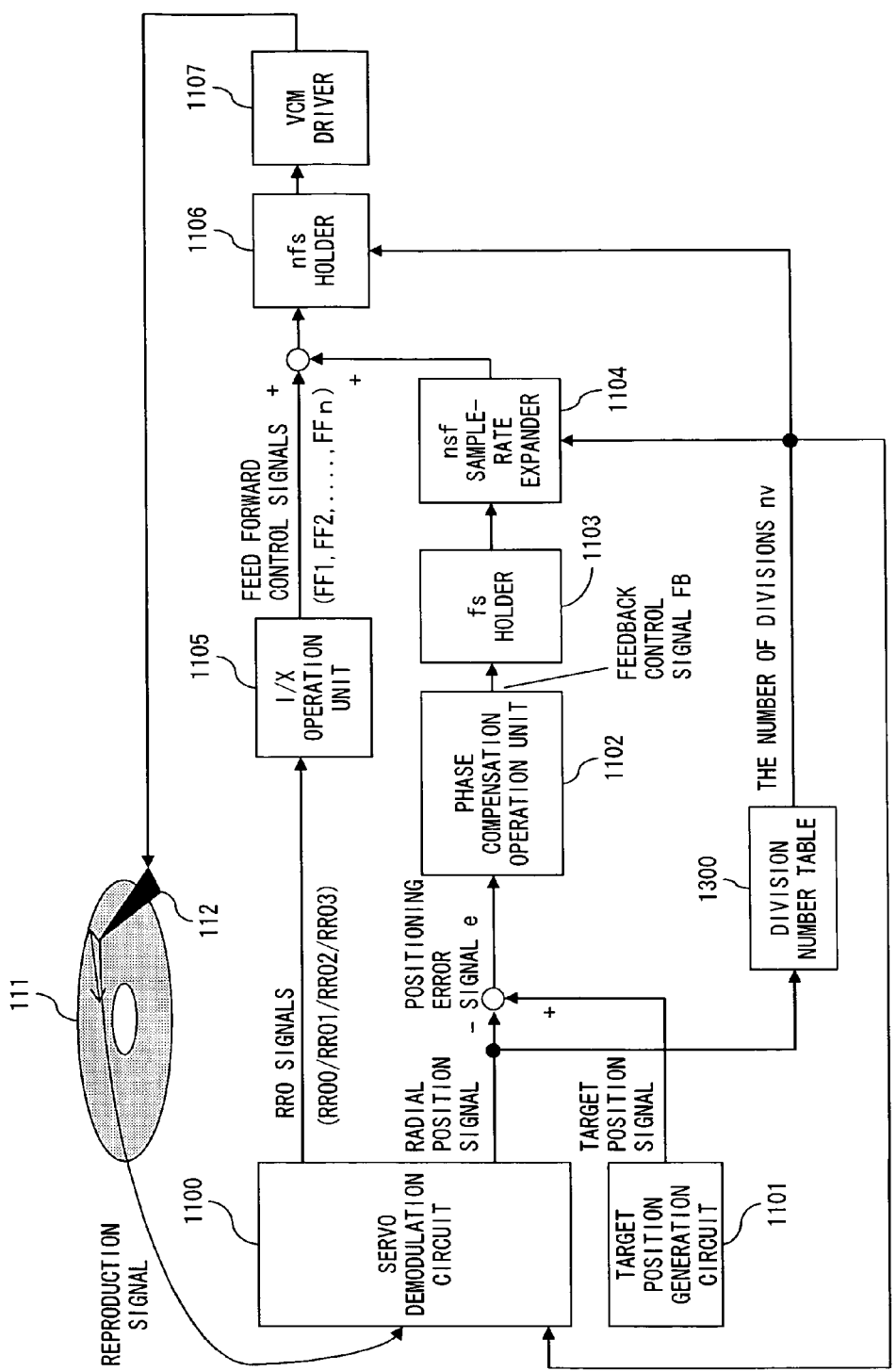
FIG. 14 is a block diagram of a positioning control system according to a second embodiment.

FIG. 14 is a block diagram of a positioning control system constituting a magnetic disk apparatus in the case of making a value of the n being variable according to a track. In the showing of FIG. 14, the same component numbers are assigned to the same configurations as in FIG. 12. The following description relates to only different parts from that of FIG. 12.

The present embodiment further comprises a division number table 1300.

The division number table 1300 comprises relationship information of each track number (i.e., radial position information) with the number of samples designated to the track. Receiving a radial position signal demodulated by the servo demodulation circuit 1100 as input and the number of samples nv of the track is outputted from the radial position signal.

The number of samples nv is reflected to a register of the servo demodulation circuit 1100 which, having received it, then the servo demodulation circuit 1100 establishes the number of division of a data sector zone of the servo sector of the track as nv and outputs nv pieces of RRO signals recorded in the servo sector. The number of samples nv is also reflected to the nfs sample-rate expander 1104 of a feedback control signal FB and to the nfs holder 1106 for a VCM driver signal.

Other operations are carried out in the same manner as in the first embodiment.

Third Embodiment

The present embodiment shows a configuration obtaining RRO information from ROM or RAM of a magnetic disk apparatus in lieu of a DTR medium.

Figure 15:
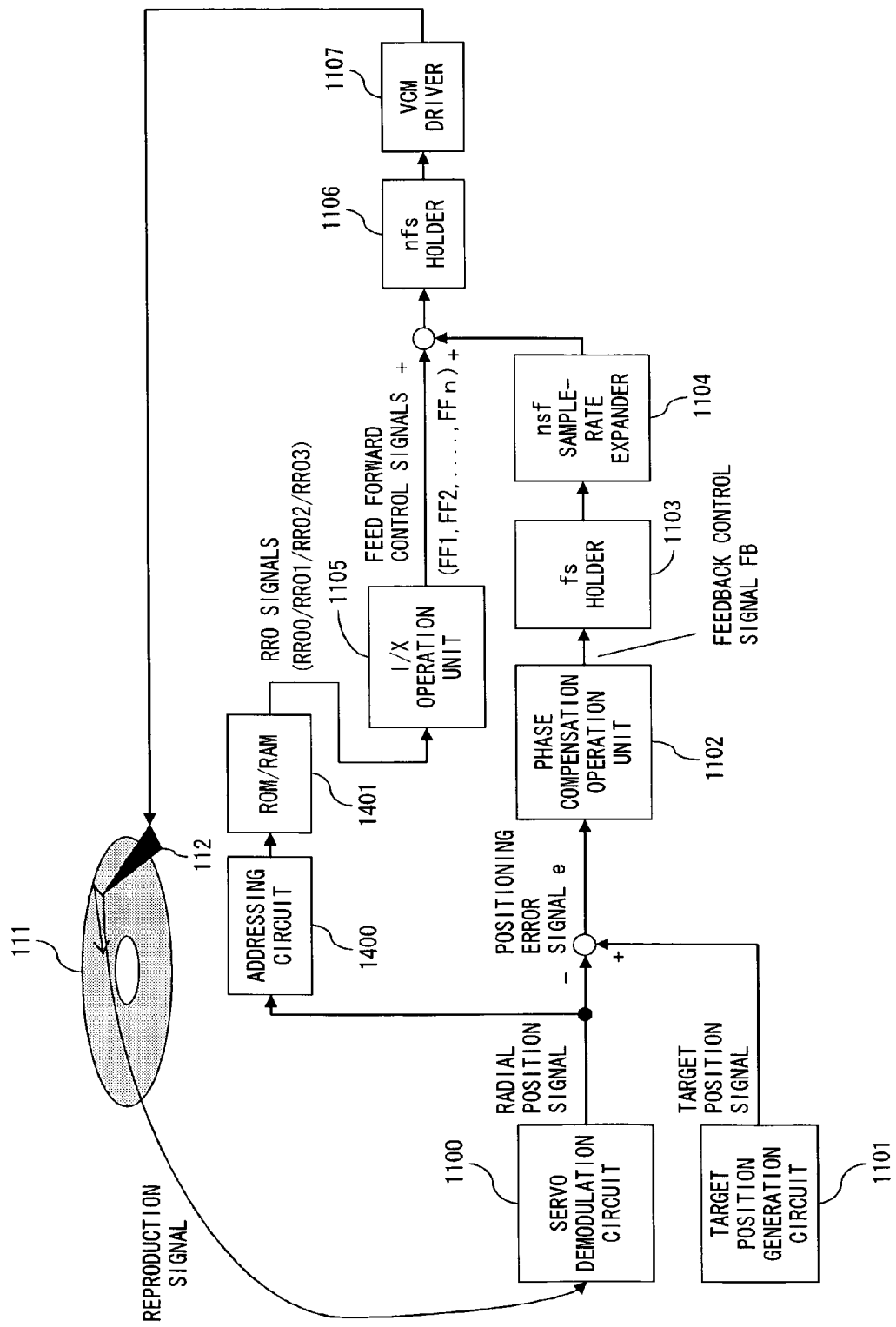
FIG. 15 is a block diagram of a positioning control system according to a third embodiment.

FIG. 15 is a block diagram of a positioning control system constituting a magnetic disk apparatus in the case of obtaining RRO information from ROM or RAM. In the showing of FIG. 15, the same component numbers are assigned to the same configurations as in FIG. 12. The following description relates to only different parts from that of FIG. 12.

The present embodiment further comprises an addressing circuit 1400 and ROM/RAM 1401 which is the second RAM 61-2 or ROM 62 shown in FIG. 6, however. Incidentally, the relevant pieces of RRO information are recorded in a specific system area within a DTR medium collectively or divisionally.

Since the present embodiment is configured not to record the RRO information in a servo sector, only a radial position signal is demodulated from the servo demodulation circuit 1100.

The ROM/RAM 1401 receives a transmission of RRO data of the entire disk surface from the system area of a DTR medium at the time of starting up the ROM/RAM 1401 and the RRO data is expanded in the ROM or RAM.

Having received a radial position signal demodulated by the servo demodulation circuit 1100, the addressing circuit 1400 indicates a storage destination address for the RRO information of the target track and target sector which are expanded in the ROM/RAM 1401.

The indication of the address causes to output n pieces of RRO information corresponding to the target track and target sector to the I/X operation unit 1105 from the ROM/RAM 1401.

The other operations are carried out in the same manner as in the first embodiment.

Note that while the present embodiment comprises the ROM/RAM 1401, the RRO information in the case of expanding it to ROM uses data, as is, recorded in flash ROM.

As described above, the present invention is contrived to measure a displacement of a servo locus within a data sector of a physical track and record the measurement result in a DTR medium as trace information, followed by using the trace information when positioning a magnetic head between data sectors. This results in the servo locus tracing the center line of a track formed by guard bands and causing the magnetic head actually to scan on the approximate center line of the track between the guard bands on a magnetic disk medium. Therefore, even a use of the DTR medium in a magnetic disk apparatus of a servo sector system makes it possible to carry out writing a data to, and reading a data from, a data sector between the guard bands by the magnetic head in high accuracy.

Note that the present invention can be embodied by discretionary combinations of the above described configurations and/or the other various configurations possible within the scope of the spirit or primary characteristics of the present invention. Because of this, the above described embodiments are merely an example in every aspect, and therefore they are not to be interpreted in any restrictive manner. The scope of the present invention is indicated by the claims herein, and it is in no way limited by the main text of the specification herein. Furthermore, modifications and changes pertaining to an equivalent scope of claims shall be within the scope of the present invention.

What is claimed is:

1. A method for measuring a displacement amount between a center line of a physical track formed in between two guard bands on a discrete track recording (DTR) medium and a servo reference locus of a magnetic head which scans thereon, comprising:

recording a repeat pattern, which is a repeatedly written magnetized state in data sector zone between each servo, in between the two guard bands;

scanning repeatedly on the repeat pattern by the magnetic head while shifting a servo locus of the magnetic head in the radial direction of the discrete track recording (DTR) medium in steps from the servo reference locus;

recording an amplitude variation of a signal reproduced by, and transmitted from, the magnetic head based on the repeat pattern during the scanning; and determining a displacement amount of the magnetic head from the servo reference locus in terms of an amplitude value which indicates the center of the physical track within the amplitude variation as the displacement amount of the physical track relative to the servo reference locus.

2. The measurement method according to claim 1, being the one for measuring a displacement amount between a center line of a physical track formed in between two guard bands on a discrete track recording (DTR) medium and a servo reference locus of a magnetic head which scans thereon, comprising:

recording a repeat pattern across the entirety of a data sector zone between the two guard bands;

scanning repeatedly across the entirety of the data sector by the magnetic head while shifting a servo locus of the magnetic head in the radial direction of the discrete track recording (DTR) medium in steps from the servo reference locus;

recording an amplitude variation of a signal reproduced by, and transmitted from, the magnetic head based on the repeat pattern during the scanning together with a position of the magnetic head on the servo reference locus and a variation thereof from the servo reference locus which indicate a position thereof on the servo locus; and determining the variation, which gains the maximum amplitude value within the amplitude variation in each position on the servo reference locus, as the displacement amount of the physical track at each position on the servo reference locus.

3. The measurement method according to claim 2, wherein a measurement of said displacement amount is carried out by the unit of said data sector on said discrete track recording (DTR) medium.

4. The measurement method according to claim 1, wherein a measurement of said displacement amount is carried out by the unit of said data sector on said discrete track recording (DTR) medium.

5. A measurement record apparatus scanning a servo sector and a repeat pattern, which is a repeatedly written magnetized state in a data sector zone between each servo sector, forming zone between the servo sector and next servo sector on a physical track of a discrete track recording (DTR) medium by a magnetic head based on a servo reference locus, comprising:
   a unit for making the magnetic head scan repeatedly on the repeat pattern between the servo sectors while shifting a servo locus of the magnetic head in the radial direction of the discrete track recording (DTR) medium by an increment of a predetermined offset amount from the servo reference locus;
   a unit for recording an amplitude variation of a signal reproduced by, and transmitted from, the magnetic head based on the repeat pattern during the scanning;
   a unit for extracting a displacement amount of the magnetic head from the servo reference locus in terms of an amplitude value which indicates the center of the physical track within the amplitude variation; and
   a recording unit for recording the extracted displacement amount in the discrete track recording (DTR) medium.

6. The measurement record apparatus scanning a servo sector and a repeat pattern forming zone between the servo sector and next servo sector on a physical track of a discrete track recording (DTR) medium by a magnetic head based on a servo reference locus according to claim 5, comprising:
   a unit for making the magnetic head scan repeatedly across the entirety on the repeat pattern formed in the entirety between the servo sectors while shifting a servo locus of the magnetic head in the radial direction of the discrete track recording (DTR) medium by an increment of a predetermined offset amount from the servo reference locus;
   a unit for retaining an amplitude variation of a signal reproduced by, and transmitted from, the magnetic head based on the repeat pattern during the scanning together with a position of the magnetic head on the servo reference locus and a variation thereof from the servo reference locus which indicate a position thereof on the servo locus;
   a unit for extracting the offset amount which gains the maximum amplitude value within the amplitude variation in each position on the servo reference locus; and
   a recording unit for recording the extracted offset amount as repeatable run out (RRO) information in the discrete track recording (DTR) medium.

7. The measurement record apparatus according to claim 6, wherein
   said recording unit averages said extracted offset amount for each predefined range of said servo reference locus and records the averaged offset amount as repeatable run out (RRO) information in said discrete track recording (DTR) medium.

8. The measurement record apparatus according to claim 6, wherein
   said recording unit averages said extracted offset amount by each predefined range of said servo reference locus and records the averaged plural pieces of offset amount as repeatable run out (RRO) information individually in a post code zone of said discrete track recording (DTR) medium.

9. The measurement record apparatus according to claim 5, wherein
   said recording unit averages said extracted offset amount for each predefined range of said servo reference locus and records the averaged offset amount as repeatable run out (RRO) information in said discrete track recording (DTR) medium.

10. The measurement record apparatus according to claim 5, wherein
   said recording unit averages said extracted offset amount by each predefined range of said servo reference locus and records the averaged plural pieces of offset amount as repeatable run out (RRO) information individually in a post code zone of said discrete track recording (DTR) medium.

11. A positioning control circuit, comprising:
   a demodulation unit for demodulating plural pieces of trace information, which are recorded in a predetermined sequence by each servo sector of a discrete track recording (DTR) medium, in the sequence; and
   a control unit for controlling a servo locus of a magnetic head according to the trace information.

12. A positioning control circuit, comprising:
   a demodulation unit for demodulating trace information from a discrete track recording (DTR) medium; and
   a control unit for controlling a servo locus of a magnetic head according to the trace information, wherein
   said demodulation unit demodulates plural pieces of trace information, which are recorded in a predetermined sequence by each servo sector of a discrete track recording (DTR) medium, in the sequence, and
   said control unit reflects, in the aforementioned sequence, the demodulated trace information for each servo sector to a servo locus of a magnetic head which scans in one data sector range.

13. The positioning control circuit according to claim 12, wherein
   said demodulation unit demodulates plural pieces of trace information and one track position information for each servo sector of a discrete track recording (DTR) medium, and
   said control unit increases the number of the track position information to that of the trace information, and adds each trace information to each track position information in sequence.

* * * * *